United States Patent
Meroux et al.

(10) Patent No.: US 11,164,406 B2
(45) Date of Patent: Nov. 2, 2021

(54) REAL-TIME EMISSIONS ESTIMATION AND MONITORING

(71) Applicant: FORD GLOBAL TECHNOLOGIES, LLC, Dearborn, MI (US)

(72) Inventors: Dominique Meroux, Fair Oaks, CA (US); Zhen Jiang, Mountain View, CA (US); Yan Fu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 16/258,168

(22) Filed: Jan. 25, 2019

(65) Prior Publication Data
US 2020/0242858 A1    Jul. 30, 2020

(51) Int. Cl.
| G07C 5/08 | (2006.01) |
| G07C 5/00 | (2006.01) |
| B60W 40/04 | (2006.01) |
| F01N 11/00 | (2006.01) |
| G05D 1/02 | (2020.01) |
| B60K 6/28 | (2007.10) |

(52) U.S. Cl.
CPC ............ *G07C 5/085* (2013.01); *B60W 40/04* (2013.01); *G07C 5/008* (2013.01); *B60K 6/28* (2013.01); *B60Y 2200/92* (2013.01); *F01N 11/00* (2013.01); *G05D 1/0217* (2013.01); *G05D 2201/0213* (2013.01)

(58) Field of Classification Search
CPC combination set(s) only.
See application file for complete search history.

(56) References Cited

U.S. PATENT DOCUMENTS

| 7,349,797 | B2 * | 3/2008 | Donnelly | 701/115 |
| 7,957,861 | B2 * | 6/2011 | McAndrew, III | 701/29 |
| 8,612,273 | B2 * | 12/2013 | Johnson | 705/7.11 |
| 8,935,084 | B2 | 1/2015 | Lin et al. | |
| 9,147,293 | B2 * | 9/2015 | Adams | G07C 5/008 |
| 9,582,943 | B1 * | 2/2017 | Morrison | G07C 5/008 |
| 9,773,364 | B2 * | 9/2017 | Kerning | G07C 9/00158 |
| 10,119,891 | B2 * | 11/2018 | Wang | G01N 1/2273 |
| 10,311,660 | B2 * | 6/2019 | Skoglund | G07C 9/00 |
| 2011/0029171 | A1 * | 2/2011 | Hyde | 701/22 |
| 2012/0172017 | A1 | 7/2012 | Ratti et al. | |

FOREIGN PATENT DOCUMENTS

| DE | 102010036224 A1 | 3/2012 |
| MX | 2014000686 A | 1/2016 |
| WO | 2010149904 A1 | 12/2010 |
| WO | 2015177495 A1 | 11/2015 |

* cited by examiner

*Primary Examiner* — Thomas G Black
*Assistant Examiner* — Anthony M Gartrelle
(74) *Attorney, Agent, or Firm* — Gregory P. Brown; Brooks Kushman P.C.

(57) ABSTRACT

A transportation mobility system includes a data storage configured to maintain vehicle data indicating fuel consumption and count of passengers for vehicles of a transportation system, and user data describing movements of the passengers within the transportation system. The system also includes an emissions monitoring portal, programmed to provide, for vehicles of a fleet, estimates of pollutant emissions for the fleet and a percent share of miles completed by zero-emissions transportation for the fleet.

21 Claims, 7 Drawing Sheets

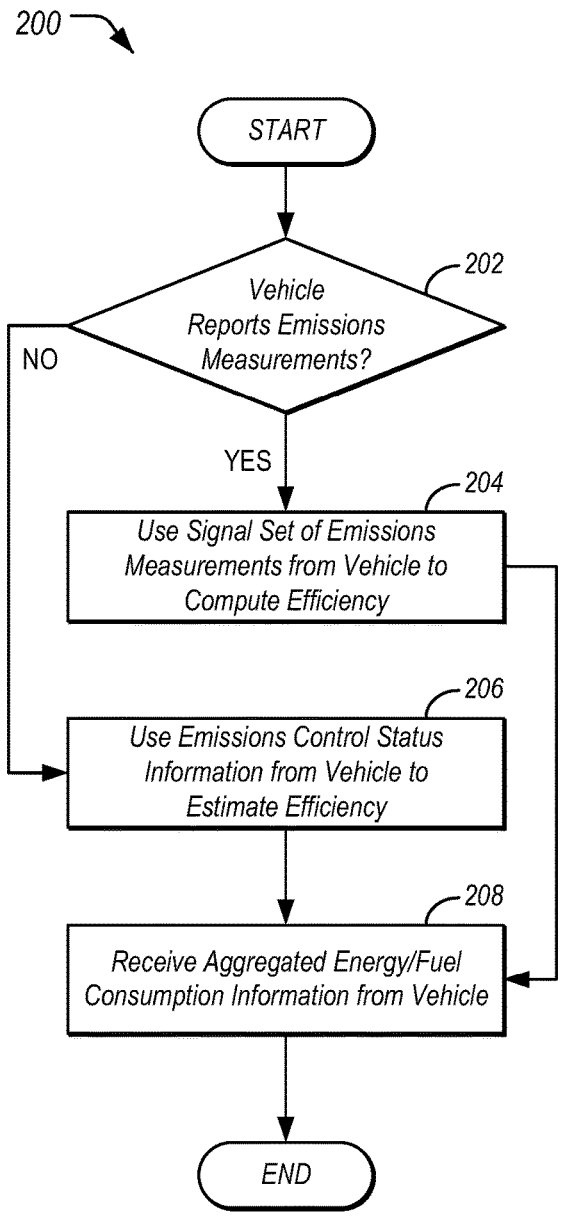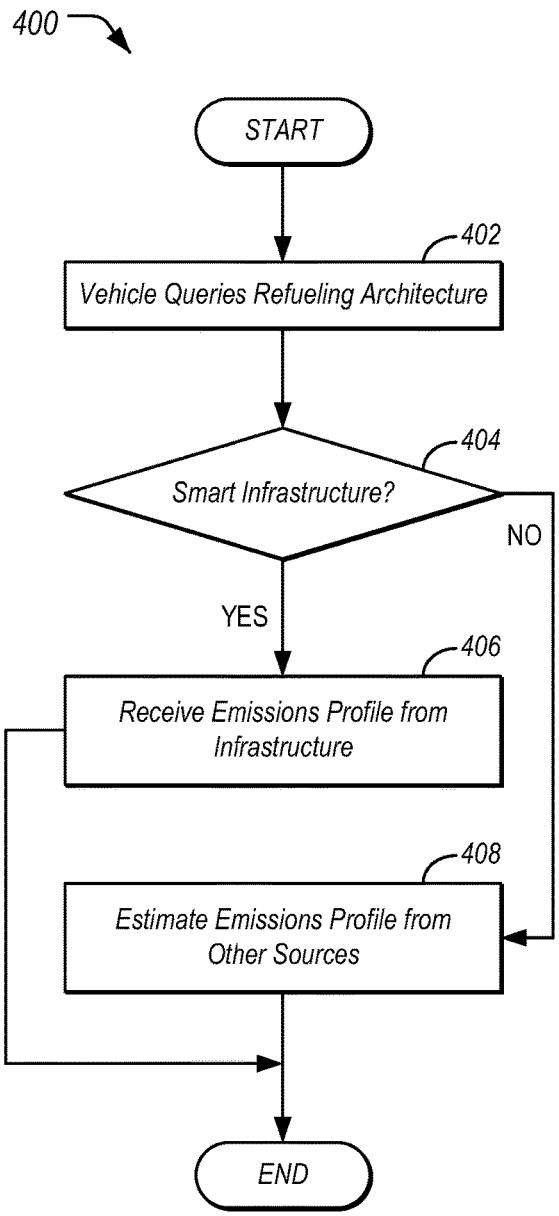
FIG. 2
FIG. 4

REAL-TIME EMISSIONS ESTIMATION AND MONITORING

TECHNICAL FIELD

Aspects of the disclosure generally relate to estimation of emissions resulting from use of vehicles.

BACKGROUND

With the advent of smart mobility services such as rideshare and microtransit, consumers now have more convenient ways to travel on-the-fly without a vehicle when needed, for example to go to and from a bar in the evening or to reach destinations when out of town. This transportation mode shift is expected to dramatically increase with the advent of autonomous vehicles, as the biggest cost to today's smart mobility services often is driver wages. Some rideshare trips result in emissions reductions, for example if a rider chooses UberPOOL and/or takes a rideshare to reach a public transit route instead of driving his or her personal vehicle. Conversely, many rideshare trips are made by people who take Uber/Lyft instead of public transit, or "induced demand" trips that otherwise would not have been made, resulting in greater traffic congestion and emissions.

SUMMARY

In one or more illustrative examples, a transportation mobility system includes a data storage configured to maintain vehicle data indicating fuel consumption and count of passengers for vehicles of a transportation system, and user data describing movements of the passengers within the transportation system; and an emissions monitoring portal, programmed to provide, for vehicles of a fleet, estimates of pollutant emissions for the fleet and a percent share of miles completed by zero-emissions transportation for the fleet.

In one or more illustrative examples, a method for estimation of emissions resulting from use of vehicles includes receiving, from vehicles of a transportation system, vehicle data indicating fuel consumption and count of passengers for the vehicles; receiving, from mobile devices of passengers, user data describing movements of the passengers within the transportation system; and allocating revenue emissions of the vehicles to the passengers according to the fuel consumption divided by the count of passengers when the passenger was a rider, and allocate deadhead emissions to the passengers divided by a total number of passengers during a vehicle service period.

In one or more illustrative examples, a non-transitory computer-readable medium comprising instructions that, when executed by one or more hardware processors of a transportation mobility cloud, cause the transportation mobility cloud to maintain, in a data storage, vehicle data indicating fuel consumption and count of passengers for vehicles of a transportation system, and user data describing movements of the passengers within the transportation system; sum greenhouse gas and criteria pollutant emissions from fleet operations, categorized by one or more of tailpipe emissions, well-to-tank emissions, or externality to other travelers, according to the received vehicle data; and provide, via an emissions monitoring portal, estimates of the greenhouse gas and criteria pollutant emissions for vehicles of a fleet and a percent share of miles completed by zero-emissions transportation for the fleet.

BRIEF DESCRIPTION OF THE DRAWINGS

FIG. 2 illustrates an example process for obtaining vehicle data from vehicles to the transportation mobility cloud to produce tailpipe emissions estimates;

FIG. 4 illustrates an example process for blockchain-based transfer of fuel supply chain information on well-to-tank emissions associated with fuel production and distribution to the vehicle;

DETAILED DESCRIPTION

Figure 1:
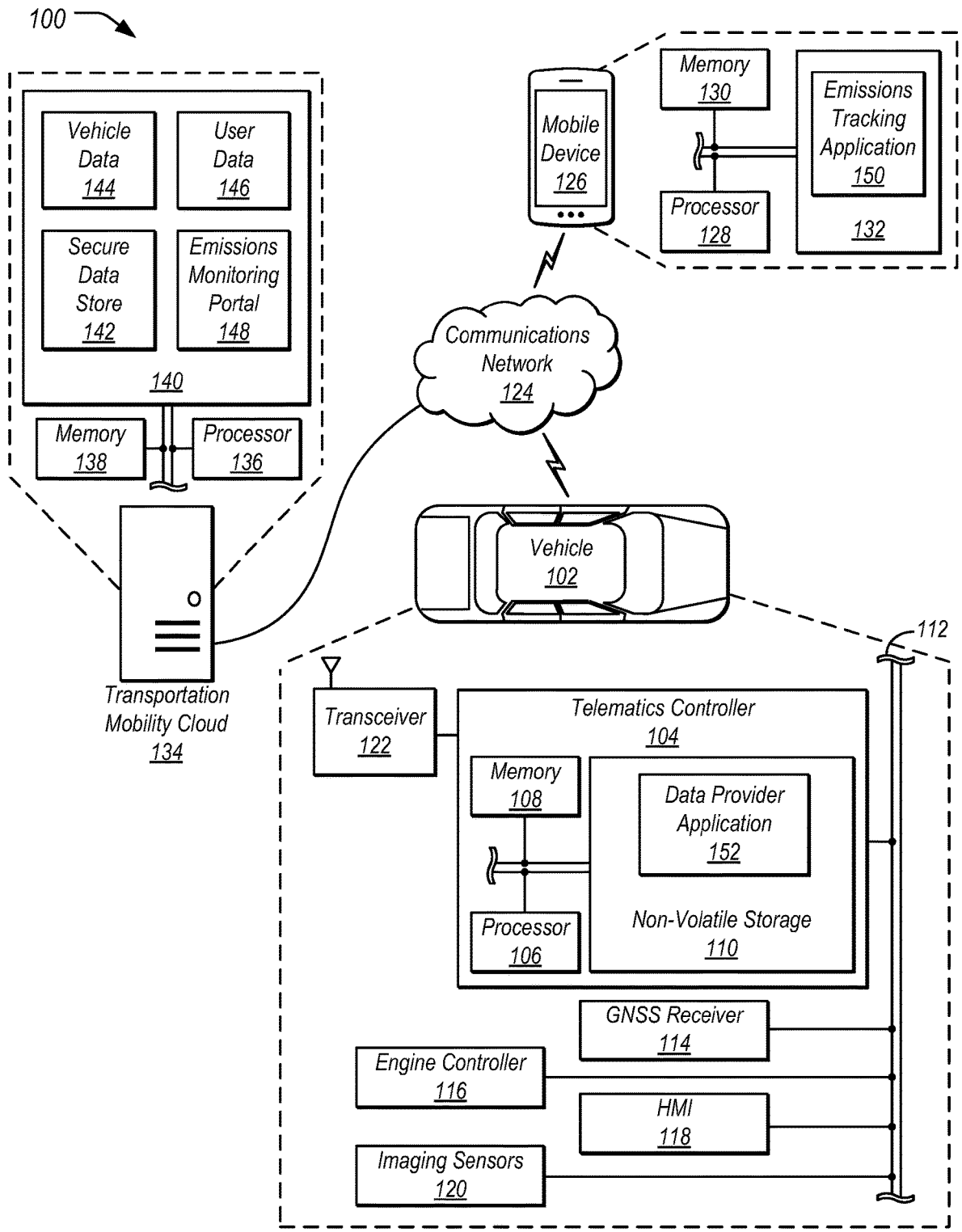
FIG. 1 illustrates an example system for performing pre-trip estimations of emissions resulting from a journey for a vehicle passenger.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Governments in large metropolitan areas struggle with the lack of transparency on the part of rideshare companies, because they hold both promise (e.g., instead of being the only passenger in a taxi, carpool with UberPOOL) and cost (e.g., public transit riders switching to a rideshare, adding to vehicle miles traveled (VMT) and air pollution). Some governments such as New York City have turned to placing a cap on the number of rideshare vehicles allowed in the city, while other governments including the State of California have passed legislation explicitly requiring development of plans to ensure increasing shares of zero-emissions vehicles in service and higher occupancy rates (e.g., fewer single-passenger Uber XL trips). These regulations also mandate the tracking of emissions-related information.

Meeting regulatory requirements and approval to operate mobility services has become a greater issue with the advent of these emissions control regulations. For example, California signed into law legislation requiring $CO_2$ emissions reduction plans from Transportation Network Companies (TNCs) to meet targets to be determined by California, beginning 2022 with reporting every two years after. These goals include to increase the deployment of zero-emission vehicles (ZEVs) by TNCs and to reduce greenhouse gas emissions per passenger mile. These dual goals will put more EVs and other clean cars on our roads and incentivize a higher number of passengers per TNC vehicle trip, with the intent to reduce congestion, VMT, and tailpipe emissions.

These regulations also include a data reporting requirement. These requirements may include for transportation network companies to determine average emissions of greenhouse gases per passenger-mile which shall include, but is not limited to, one or more of the following: (i) total miles completed by drivers; (ii) percent share of miles completed by qualified zero-emission means, including miles completed by vehicle, walking, biking, other modes of active transportation, and zero-emission vehicles; (iii) miles-weighted average network-wide grams of carbon dioxide per mile to produce an estimate of the emissions of greenhouse gases; and (iv) total passenger-miles completed using an average passengers-per-trip estimate to account for trips where exact passenger head count data was not captured.

However, precise energy consumption and emissions associated with each trip are not accounted for, as most competitor solutions rely on estimates that are not thorough or high-resolution in accounting of emissions, in part due to lack of available data. Some systems provide a wealth of travel data from phone sensors, but provide no good way to access vehicle telemetry data, so a car trip may have been made by a hybrid sedan or a full-size commercial truck, with no way for the system to make the distinction. Furthermore, even if such systems are able to obtain vehicle information (e.g., a VIN), fuel economy of commercial vehicles or microtransit shuttles, are not officially rated and real-world fuel economy depends on loads (e.g., towing, etc.).

Ability to maintain precision along each step of multi-modal journeys is lacking. If a driver of a vehicle transferred to a train or shuttle, the vehicle may be unable to continue counting the trip's emissions. Some system estimates are higher-level, so the value was always an estimate, and other systems simply assign some average value to estimate CO2.

Separate applications to facilitate behavioral change for consumers, enterprise clients and government, and mobility fleet operators does not exist. In some system's city-level estimate, for example, the public can view city-level emissions; however, the system will not show the values a consumer needs to know in order to change their behavior in an optimal way.

A consumer-facing application, such as a smartphone application, may be utilized by users to understand the potential emissions resulting from different transportation options. The application may allow a user to specify a trip origin and destination, and have returned several travel options, each with an associated ex-ante emissions estimate. An implementation of gamification may be used to facilitate behavioral change, which is critical in achieving long-term emissions reductions due to the inertia to switching travel patterns and the habit-forming nature of transportation mode choice.

An emissions monitoring portal of a transportation mobility cloud may be utilized to provide information to enterprises, governments, and/or fleets with respect to travel and emissions. The emissions monitoring portal may be programmed to provide ex-post calculated values aimed at providing high-resolution precision to support decision-making, including recommendations of the most cost-effective and impactful measures to take. It should be noted that many examples herein relate to emissions in terms of greenhouse gases which are gases that contributes to the greenhouse effect by absorbing infrared radiation, e.g., carbon dioxide and chlorofluorocarbons. However, it should be noted that emissions may also include other gases such as the criteria air pollutants identified by the Environmental Protection Agency (EPA), e.g., carbon monoxide, lead, ground-level ozone, nitrogen dioxide, particulate matter, and sulfur dioxide. Further aspects of the concepts are described in detail herein.

FIG. 1 illustrates an example system 100 for performing pre-trip estimations of emissions resulting from a journey for a vehicle passenger. As shown, the system 100 includes a vehicle 102, a mobile device 126, and a transportation mobility cloud 134, each configured to communicate with one another over a communications network 124. The mobile device 126 may execute an emissions tracking application 150 to provide pre-trip estimations of emissions to users and to provide user data 146 to the transportation mobility cloud 134. The vehicles 102 may utilize a data provider application to provide vehicle data 144 to the transportation mobility cloud 134. The transportation mobility cloud 134 may utilize a secure data store 142 to maintain vehicle data 144 and user data 146. The transportation mobility cloud 134 may also utilize an emissions monitoring portal 148 to provide emissions information based on the data maintained by the secure data store 142. While only a single vehicle 102 and mobile device 126 are shown in FIG. 1, it should be noted that systems 100 may include many such vehicles 102 and mobile devices 126. Moreover, it should also be noted that the transportation mobility cloud 134 is not limited to a single location, and may be a distributed hosting system.

The vehicle 102 may include various types of automobile, crossover utility vehicle (CUV), sport utility vehicle (SUV), truck, recreational vehicle (RV), boat, plane, scooter, bicycle, drone, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Other possible powertrains for the vehicle 102 may include plug-in hybrid, battery electric, and hydrogen fuel cell. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 may include a telematics controller 104. The telematics controller 104 utilizes various types of computing apparatus in support of performance of the functions of the telematics controller 104 described herein. In an example, the telematics controller 104 may include one or more processors 106 configured to execute computer instructions provided to a memory 108, and a storage 110 medium on which the computer-executable instructions and/ or data may be maintained. A computer-readable storage medium (also referred to as a processor-readable medium or storage 110) includes any non-transitory (e.g., tangible) medium that participates in providing data (e.g., instructions) that may be read by a computer (e.g., by the processor(s) 106). In general, a processor 106 receives instructions and/or data, e.g., from the storage 110, etc., to the memory 108 and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C

, FORTRAN, PASCAL, VISUAL BASIC, PYTHON, JAVA SCRIPT, PERL, PL/SQL, etc.

The telematics controller 104 may be further configured to communicate with other components of the vehicle 102 via one or more in-vehicle networks 112. The in-vehicle networks 112 may include one or more of a vehicle controller area network (CAN), an Ethernet network, and a media-oriented system transfer (MOST), as some examples. The in-vehicle networks 112 may allow the telematics controller 104 to communicate with other vehicle 102 systems, such as a global navigation satellite system controller 114 configured to provide current vehicle 102 location and heading information, an engine controller 116 configured to provide control of engine operating components (e.g., idle control components, fuel delivery components, emissions control components, etc.) and monitoring of engine operating components (e.g., status of engine diagnostic codes); a human-machine interface (HMI) 118 configured to provide input and output capabilities to vehicle 102 occupants (e.g., via display screens, speakers, touch panels, discrete buttons, etc.); and various imaging sensors 120 (e.g., cameras, LIDAR, etc.) configured to provide imaging of the surroundings of the vehicle 102. It should be noted that this list of components of the vehicle 102 is not intended to be limiting, and communication may be performed between other controller as well, such as a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management system configured to provide control and monitoring of heating and cooling system components (e.g., compressor clutch and blower fan control, temperature sensor information, etc.).

The telematics controller 104 may utilize a cellular modem or other network transceiver 122 to facilitate communication over the communications network 124 between the vehicle 102 and other devices of the system 100. The communications network 124 may include one or more interconnected networks such as the Internet, a cable television distribution network, a satellite link network, a local-area network, a wide-area network, and a telephone network, as some non-limiting examples. Using the network transceiver 122, the vehicle 102 may be able to send outgoing data from the vehicle 102 to network destinations on the communications network 124 and receive incoming data to the vehicle 102 from network destinations on the communications network 124.

The mobile devices 126 may be any of various types of portable computing device, such as cellular phones, tablet computers, smart watches, laptop computers, portable music players, or other devices capable of communication over the communications network 124 using a network transceiver (not shown). As with the telematics controller 104, the mobile device 126 may include one or more processors 128 configured to execute computer instructions from a memory 130, and a storage medium 132 on which the computer-executable instructions and/or data may be maintained.

Similarly, the transportation mobility cloud 134 may also include networking and computing hardware configured to provide data services related to the vehicles 102 to vehicles 102 and mobile devices 126. This hardware of the transportation mobility cloud 134 may also include one or more processors 136, memories 138, storages 140, and networking facilities (not shown).

The transportation mobility cloud 134 may include a secure data store 142 that allows the transportation mobility cloud 134 to perform database functionality including the storage, update, and retrieval of relational information. Databases or data repositories such as the secure data store 142 may include various kinds of mechanisms for storing, accessing, and retrieving various kinds of data, including a hierarchical database, a set of files in a file system, an application database in a proprietary format, a relational database management system (RDBMS), etc. The secure data store 142 may employ features of the computer operating system and may also utilize the file system via the computer operating system, and may store and retrieve files stored in various formats. An RDBMS generally employs the known Structured Query Language (SQL) in addition to a language for creating, storing, editing, and executing stored procedures, such as the PL/SQL language mentioned above.

As discussed in detail below, the secure data store 142 of the transportation mobility cloud 134 may maintain information including vehicle data 144 indicative of operation of vehicles 102 in the system 100 as well as user data 146 indicative of the multimodal travels of individuals using the vehicles 102 of the system 100. Additionally, an emissions monitoring portal 148 may be an application or library included on the storage of or otherwise accessible by the transportation mobility cloud 134. The emissions monitoring portal 148 may include an interface to the data stored to the transportation mobility cloud 134. When accessed, the emissions monitoring portal 148 may be configured to allow the user to access, view, and update aspects of the vehicle data 144 and user data 146 maintained by the transportation mobility cloud 134.

The emissions tracking application 150 is an example of an application installed to the storage 132 of the mobile device 126. When executed by the mobile device 126, the emissions tracking application 150 allows for the performance of pre-trip estimations of emissions resulting from a journey for a vehicle 102 passenger. More specifically, the emissions tracking application 150 may serve on the consumer side both to (i) encourage longer-lasting behavioral changes of transportation mode choice to low-carbon options, such as public transit and shared mobility services; and (ii) encourage low-carbon vehicle and fuel type choices by including a precise expected value given each individual's vehicle, including historical usage of fuel type in that average, for example biofuel percentage or share of a trip made on electricity in a plug-in hybrid.

The emissions tracking application 150 allows a user to specify a trip origin and destination, and have returned several travel options, each with an associated ex-ante emissions estimate. An implementation of gamification will be used to facilitate behavioral change, which is critical in achieving long-term emissions reductions due to the inertia to switching travel patterns/habit-forming nature of transportation mode choice In a first example, the emissions tracking application 150 may take advantage of the behavioral economics concept of loss aversion, for example by giving each commuter in a business park a dollar or points amount, and then subtracting from that some amount each trip based on the social cost of a given commute mode choice. Each point of decision and view of balance would be prior the point of decision before starting a trip, thus making visible the trip cost.

In a second example, the emissions tracking application 150 may modify the consumer utility function associated with non-single-occupant vehicle trips, for example by having a social experience/networking component, discounts or free items on popular and/or customer-preferred products to fill wait times during multi-modal transfers or electric vehicle charging as a reward for choosing a more socially-optimal commute (e.g., a free food item at a café by the transit stop). This could be a source of revenue for mutual consumer and business benefit—if many consumers with certain preferences (e.g., known to be frequent Starbucks customers) have some wait time at a given stop, businesses such as Starbucks may be interested in this information, and those consumers would be happy to see Starbucks add a location there.

Regarding data collection, vehicle data 144 from the vehicles 102 and user data 146 from the mobile devices 126 may be provided via the communications network 124 to the transportation mobility cloud 134. In an example, instantaneous vehicle 102 telemetry data, including instantaneous fuel consumption, fuel type, fuel source/carbon pathway, any on-vehicle emissions sensors, and passenger count, may automatically be sent to the transportation mobility cloud 134 via a data provider application 152 executed by the telematics controller 104. In an example, this vehicle data 144 may be stored through use of a blockchain ledger. Multiple players with differing motivations may be able to service the consensus-building functionality of blockchain, for example cloud-connected fuel infrastructure, peer vehicles, and government entities. Additionally, to the extent that multiple players are involved, those multiple players may be participants in the data storage aspect as well as in the building of consensus.

A manufacturer of the vehicles 102 (or a manager of a fleet of vehicles 102) may maintain direct access to the vehicle data 144 from its vehicles 102 to be provided to the transportation mobility cloud 134. The manufacturer may also make arrangements to allow for other manufacturers or fleet managers to broadcast their vehicle data 144 through the transportation mobility cloud 134 as well (e.g., via embedded modems of the respective vehicles 102.)

It should be noted that in some examples, the vehicles 102 may lack integrated network transceivers 122. In such examples, alternate channels may be used to provide vehicle data 144 from vehicles 102 to the transportation mobility cloud 134. In an example, an on-board diagnostics (OBD) plug-in device may be installed to receive vehicle data 144 from the in-vehicle network 112 to provide to the transportation mobility cloud 134. It should also be noted that the vehicles 102 may include various modes of transportation, including, but not limited to, bikeshare bicycles, privately-owned vehicles 102, microtransit vehicles 102, and public transit buses.

The vehicle data 144 received by the transportation mobility cloud 134 from the vehicles 102 may be labeled according to type and quality. In an example, a label may indicate whether a vehicle data 144 element is a tailpipe emissions estimate or whether the vehicle data 144 element is an actual value from on-vehicle sensors. If, for example, a future regulation requires certain criteria for vehicle data 144 and/or any internal analytics are done, these labels may be useful in differentiating the type and quality of the vehicle data 144 maintained by the transportation mobility cloud 134.

In addition to the tracking of telemetry and emissions vehicle data 144 from vehicles 102, the transportation mobility cloud 134 may also track user data 146 regarding the movements of individuals across a multi-modal journey as well as identifying the number of occupants at any given time in a vehicle 102. To do so, the emissions tracking application 150 installed to the mobile device 126 may be programmed to automatically detect entry and exit of the user of the mobile device 126 to public transit, shared mobility services, or personal vehicles 102. To improve the coverage of user data 146 received from tracked individuals, it should be noted that this data collection aspect of the emissions tracking application 150 may be a universal application which has versions that are capable of execution on various types of mobile devices 126, such as phone, smart watches, and/or smart commute card/pass). An analogy of the tracking provided by the emissions tracking application 150 may be an airline application automatically checking a customer into his or her flight when the customer reaches the airport. As a further possibility, the detection performed by the emissions tracking application 150 may be utilized both for logging the multi-modal journey and also for billing purposes.

This tracking of the movement of individuals may be based on access to user data 146 received from sensors of the mobile device 126, such as accelerometers, GNSS, scanners, or input from transportation applications indicative of the beginning or ending of rides. For instance, the emissions tracking application 150 may utilize mobile device 126 sensors to obtain user data 146, including location and vehicle speed, relative to those sensors on the vehicle 102. Over the course of a trip, the classification certainty should be nearly 100%, given the unlikelihood of another nearby vehicle matching speed and location. As another possibility, the mobile device 126 may utilize a data connection to an on-vehicle (hardware) sensor that recognizes the device's signature and may use that connection to receive user data 146 regarding the travel of the user as an occupant of the vehicle 102. An automated approach, for instance associating boarding and exiting with an automated "tag-on, tag-off" action (e.g., detection of when the user boarded and exited via door open close actions and/or wireless proximity sensors) may improve the accuracy of the user data 146 regarding the movements of individuals, because manual input from the user may be less reliable than automated detection.

As another example of the tracking of the movement of individuals, user data 146 from existing check-in systems may be used. For instance, some existing public transit vehicle 102 or rideshare services require a check-in action, so an approach for user tracking may be done by accessing existing user data 146 used to bill a user for a trip based on the stop he or she enters and exits (e.g., as done by the Caltrain system in the San Francisco Bay Area). For personal vehicles 102, user tracking may be performed using the device pairing between the vehicles 102 and the mobile device 126. As another possibility, user tracking may be tied to a radio frequency identifier (RFID) badge corresponding to the user being tracked. These approaches may also have the benefit of making personalized settings user data 146 available to the transportation mobility cloud 134 for use when the user enters other configurable environments (e.g., ambient lighting, music recommendations, phone connection, etc.).

Seat belt status for each seat may also be used as an approach for generating user data 146 to track the movement of individuals. For instance, the seat belt engage may be used as proxy for the user starting the ride while the seat belt disengage status may be used for the user ending the ride. However, some users fail to buckle or buckle late in a ride or may not wish to be tracked via buckle status and so may not comply. Yet another possible approach for tracking users may be done via facial recognition or other video or image recognition on entry and exit to vehicles 102.

Regarding post-trip results, the emissions monitoring portal 148 may be utilized to provide information to enterprises, governments, and/or fleets with respect to travel and emissions. The emissions monitoring portal 148 may be programmed to provide ex-post calculated values aimed at providing high-resolution precision to support decision-making, including recommendations of the most cost-effective and impactful measures to take.

In a first example, a large enterprise client receives a travel/emissions profile of its workforce and does not want to build an additional parking structure as it expands. Using the transportation mobility cloud 134, the emissions monitoring portal 148 may be used to recommend a microtransit shuttle service to connect to a main public transit route, as the data stored by the transportation mobility cloud 134 may be used to compute an extent of emissions reduction this would achieve.

In a second example, an autonomous vehicle rideshare operator may desire to understand whether it is in compliance with regulations surrounding zero-emissions miles driven and average occupancy rate requirements. The transportation mobility cloud 134 data may show the fleet is falling slightly short, so recommended viable solutions are proposed. When the reporting deadline approaches, the fleet observes requirements have been met and submit documentation to the regulator.

In a third example, a city may have goals for meeting transportation needs in a sustainable way. The city may operate a fleet of forty-foot (fossil-sourced) compressed natural gas (CNG)-fueled buses. Although CNG is cleaner-burning than diesel from a tailpipe emissions perspective, the city may be able to improve a well-to-wheel (WTW) efficiency calculation by switching to renewable CNG from landfill gas or dairy methane. In addition, the transportation mobility cloud 134 data may reveal that ridership on certain routes is consistent, but never reaches the maximum capacity that smaller 14-passenger vans could hold.

Separate calculations for consumers (ex-ante) and government/enterprise (ex-post) may be performed by the transportation mobility cloud 134 to provide the most relevant information to achieve these different goals under the umbrella of emissions reduction. For example, given uncertainty of occupancy rate on a public transit bus, it would be unfair to punish a consumer for being the only person on that bus by assigning him or her the full CO2 cost of a single-passenger diesel bus. On the other hand, tracking the fact that a bus trip was made with one passenger on board, for example, is critical for the accounting to be meaningful to the local transit agency and city planners.

The system 100 may implement an (ex-post) passenger emissions calculation framework. Prior to taking a trip, the customer may be shown, via the emissions tracking application 150, a CO2 estimate for each viable mode choice to reach his or her destination (e.g., driving=10, public transit=5). After the trip is complete, the customer may use the emissions tracking application 150 to observe the CO2 value that was previously estimated (e.g., customer chooses Public Transit, CO2=5). On the backend, the transportation mobility cloud 134 may compute a precise actual value for CO2 based on vehicle data 144.

This framework may handle two cases of vehicle 102 connectivity. First, all vehicles 102 are connected to the transportation mobility cloud 134 and provide the vehicle telemetry data 144 needed to calculate CO2 either through an on-board modem (e.g., transceiver 122) or an on-board diagnostics (OBD) plug-in device. Second, only some vehicles 102 are connected to the transportation mobility cloud 134 and provide required variables, and calculation for others requires estimates. To handle the second case, a vehicle identification number (VIN) may be provided for personally-owned vehicles 102 or rideshare vehicles 102 to estimate fuel economy, or historical data (e.g., per the National Transit Database) can be used. Segments of a trip made by cycling or walking may be deemed to count as zero emissions, as if a trip had not been made. One potential exception could be a bikeshare or scooter share scheme where a small amount of emissions required for fleet rebalancing may be shared across the entire user base.

FIG. 2 illustrates an example process 200 for obtaining vehicle data 144 from vehicles 102 to the transportation mobility cloud 134 to produce tailpipe emissions estimates. One aspect of the computation of CO2 figures is tailpipe emissions. Tailpipe emissions responsibility is a relatively straightforward calculation with two components, instantaneous emissions and passenger count. In some cases, these emissions may be referred to as tank-to-wheels (TTW) emissions. It should also be noted that the combination of well-to-tank (WTT) and tank-to-wheels (TTW) emissions may be referred to as well-to-wheels (WTW) emissions.

At operation 202, the transportation mobility cloud 134 determines whether the vehicle 102 reports emissions measurements. For example, if the vehicle data 144 includes a signal set specific to vehicle emissions measurement, control passes to operation 204. If, however, the vehicle data 144 does not include a signal set specific to vehicle emissions measurement, several other variables may be used to estimate emissions in a realistic manner, and control passes to operation 206.

At 204, the transportation mobility cloud 134 uses the signal set specific to vehicle emission measurement to perform vehicle emissions computations. In an example, these signals may include CO2 as well as criteria pollutants such as NOx, PM 2.5, etc., which as measured pollutant exhaust values may be used to assign a tailpipe emissions value. In addition, emissions control system status information, including catalyst temperature, warm-up status, and diesel emissions control systems, may be received by the transportation mobility cloud 134. If emissions are especially high for a vehicle 102 (e.g., two standard deviations above average), then this vehicle data 144 may help indicate that the vehicle 102 requires servicing.

At 206, the transportation mobility cloud 134 uses other variables to estimate emissions in a realistic manner. In an example, the emissions control system status information, including catalyst temperature, warm-up status, and diesel emissions control systems, may be received by the transportation mobility cloud 134. This information may be used to aid in estimating a precise emissions profile in combination with fuel consumption information received from the vehicle 102.

After operations 204 or 206, control passes to operation 208. At 208, instantaneous energy/fuel consumption data is continuously collected and aggregated. In an example, the aggregation is performed on-vehicle, and then received from the vehicle 102 (e.g., via the transceiver 122, via an ODB-II dongle, via the mobile device 126, etc.) to the transportation mobility cloud 134. In an example, the transportation mobility cloud 134 receives the data at a constant interval and/or responsive to a change in passenger occupancy of the vehicle 102 and/or operating status (e.g., EV is not driving, now charging, or vehicle 102 ignition switched on or off). In addition, regarding instantaneous energy consumption and fuel type, gasoline and flex-fuel E85-capable vehicles may report out an alcohol fuel percentage, diesel and biodiesel B20-capable vehicles may report out a biodiesel percentage, bi-fuel vehicles may report out the fuel type they are using at a given instant (e.g. bi-fuel CNG/gasoline running on CNG), and plug-in vehicles may report out whether they are using electricity or gasoline at a given instant. Regarding emissions control system status information, the vehicle data 144 may specify catalyst temperature, warm-up status, engine off time, ambient air temperature, and for diesel vehicles, any diesel emissions control system signals, can be used to project cold-start events and overall instantaneous emissions levels. Mid-trip cold-start events for plug-in hybrids (PHEV) may also be accounted for with this approach. Passenger count may then be used to assign emissions responsibility. After operation 208, the process 200 ends.

Figure 3:
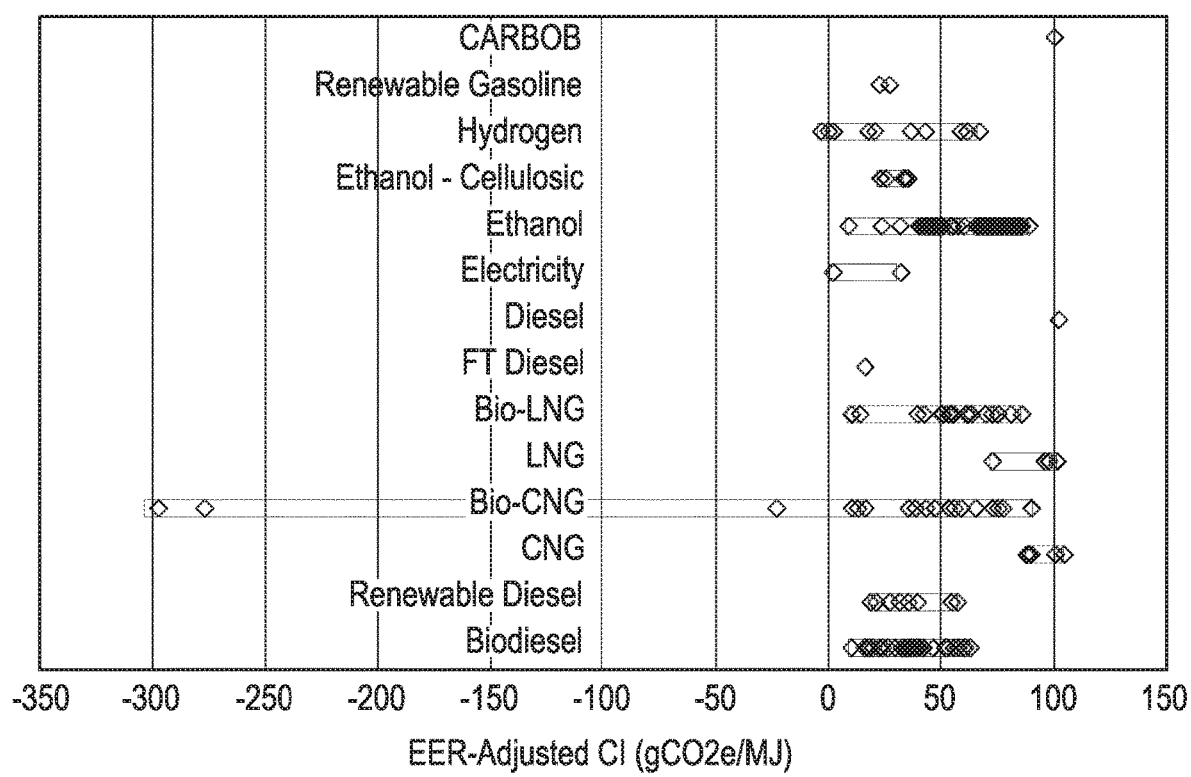
FIG. 3 illustrates a graph indicating variation in emissions from various fuel pathways.

FIG. 3 illustrates a graph 300 indicating variation in emissions from various fuel pathways. As shown, these example emissions are determined from the California Air Resources Board (CARB) by, " . . . feedstock types, origin, raw material production processing efficiencies, and transportation . . . " Regarding well-to-tank (WTT) emissions, accounting for emissions from fuel production is critical to both maintaining an accurate portrayal of emissions from a trip and promoting low-carbon pathways.

FIG. 4 illustrates an example process 400 for blockchain-based transfer of fuel supply chain information on well-to-tank emissions associated with fuel production and distribution to the vehicle 102. The process 400 may, accordingly, allow for the vehicle 102 to utilize various possible methods of obtaining well-to-tank emissions.

At operation 402, the vehicle 102 queries refueling architecture to determine whether it has "smart" capability. In an example, the vehicle 102 pulls up to a fuel pump (e.g., a liquid or gaseous fuel pump for fuels such as gasoline, E85, CNG/LPG, or hydrogen) or a charging station (e.g., BEV PHEV, etc.). The vehicle 102 may attempt to query the refueling infrastructure to determine if it is able to transfer blockchain-based values for WTT emissions intensity of dispensed fuel. Next at 404, if the refueling infrastructure is smart, control passes to operation 406. If not, control passes to operation 408.

At operation 406, the vehicle 102 receives emissions profile information from the refueling infrastructure. In one example, WTT emissions may be obtained via communication with the refueling infrastructure that is a part of the blockchain CO2 accounting network that provides the vehicle 102 with a carbon intensity value based on a universally-accepted accounting method (e.g., a value associated with a CARB-certified fuel pathway). For instance, as the refueling infrastructure does support blockchain transfer of an emissions profile for the fuel, the vehicle 102 accepts the values in a standardized protocol and submits the values from the vehicle 102 to the transportation mobility cloud 134 (e.g., via the transceiver 122, via an ODB-II dongle, via the mobile device 126, etc.). The emissions profile information may then be used by the transportation mobility cloud 134 to compute the passenger WTT emissions responsibility. After operation 406 the process 400 ends.

At operation 408, the vehicle 102 receives emissions profile information from other sources. In another example, no communication with the refueling infrastructure is performed, but the vehicle 102 recognizes the refueling pump or charging station and identifies an appropriate carbon intensity value. For instance, the vehicle 102 may determine its location (e.g., using the GNSS receiver 114) to match with an internal transportation mobility cloud 134 maintained database of available information (e.g., publicly-published renewable fuel content for a hydrogen station.) Hydrogen fuel stations also publicly list the percentage of fuel generated from renewable sources. For electric vehicles 102, a rough estimate could be made given the local utility's grid mix. As another example, on-board vehicle 102 sensors may detect any hydrogen content in CNG, an ethanol percentage (gasoline) or biodiesel (diesel). Typical gasoline may have ~9.8% ethanol content rated as E10 (up to 10%); some gasoline sold in the US is an E15 blend; and flex-fuel vehicles 102 are capable of accepting any combination of gasoline and E85 (up to 85% ethanol, although actual value is typically slightly lower). These examples of cleaner fuel blends and biofuel percentage can give a better sense of WTT emissions profile information for the fuel. After operation 408 the process 400 ends.

It should be noted that ambient factors such as air pressure, temperature, and humidity may, in some cases, have an effect on the severity of the effect of vehicle emissions. For instance, a high moisture content in the air causes the combustion processes losses some energy to water. Thus, in some circumstances, the vehicle 102 may further utilize data with respect to ambient factors to determine fuel consumption and emissions release.

Figure 5:
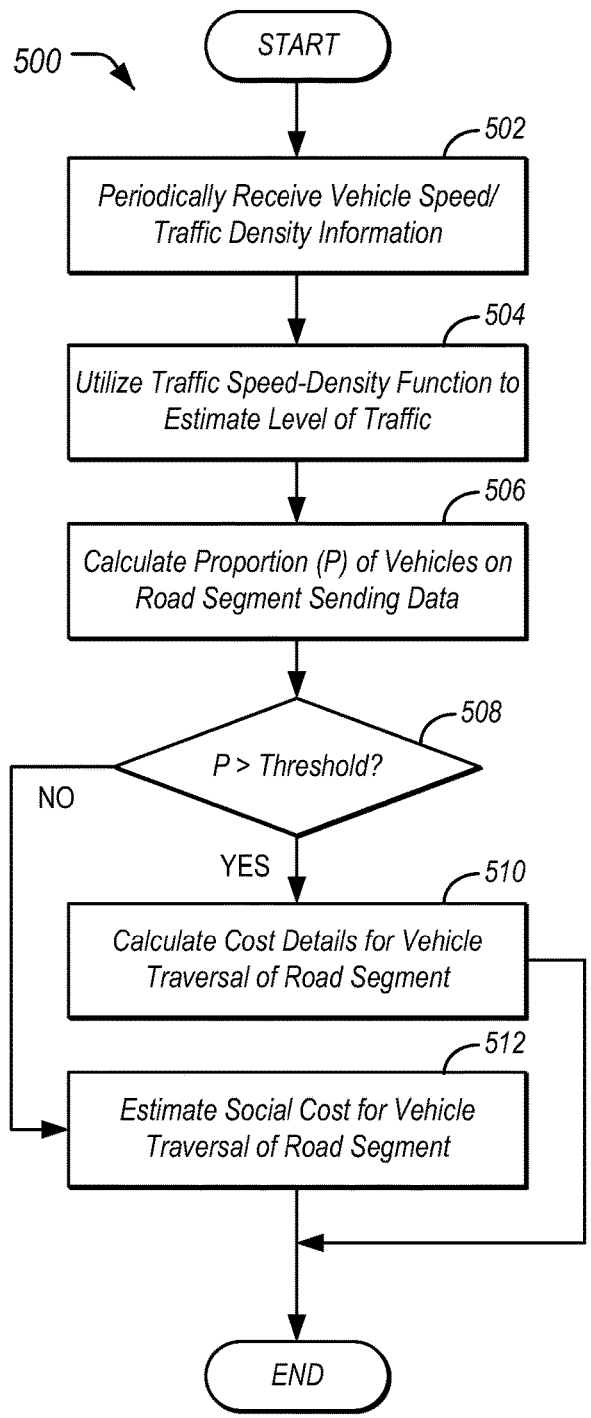
FIG. 5 illustrates an example process for calculation of traffic congestion externalities.

FIG. 5 illustrates an example process 500 for calculation of traffic congestion externalities. With respect to externalities on traffic congestion, each vehicle 102 added to the road contributes a negative externality in the form of adding to traffic congestion, with impacts ranging from virtually nothing in the case of an off-peak time with free-flow traffic to having a significant impact on other vehicles 102. This externality has the highest per-passenger cost from single-occupant vehicles 102. This externality represents the most difficult component to add with precision; however, the larger the share of transportation mobility cloud 134 connected vehicles 102, the more accurate the estimate.

A speed-density relationship may be used to estimate traffic externality. Conceptually, it can be seen that there is a functional relationship between traffic speed and density of the traffic. In instances where less than a threshold proportion of vehicles 102 in traffic are reporting high-resolution data to the transportation mobility cloud, certain approaches may be performed. For instance, a "best available" speed-density function may be selected from literature, and vehicle 102 instantaneous speed relative to the road's speed limit may be used to estimate traffic density. Additionally, the average speed impact of a scenario may be estimated where that density is the current traffic density (e.g., in vehicles/lane-km) less one vehicle 102, which has corresponding impacts on overall travel times (economic cost) and average speed (the current gasoline-only fleet of vehicles is more fuel efficient at higher speeds than at low speed in traffic). Specific to the emissions impact, models such as the EPA MOVES model and/or the California EMFAC/VISION model may be used to estimate fleet average specifications for a given region, for added precision.

In instances where at least the a threshold proportion of vehicles 102 in traffic are reporting high-resolution data to the transportation mobility cloud, certain approaches may be performed. At this point, traffic density is known because all vehicles 102 are reporting out their location and speed. Further, each vehicle 102 reports out its instantaneous energy consumption and emissions rates (and presumably, a historical record is stored, perhaps even for the road segment in question at different levels of traffic).

Additionally, regarding traffic externality calculation, certain driver actions can have a disproportionate impact on traffic congestion, and connected vehicle data can report out both positive and negative contributing factors, which can be used to quantify more significant traffic congestion impacts than simply having presence on a road. As a positive example: maintaining a reasonable headway, for example through adaptive cruise control, careful autonomous vehicle driving, or a fleet driving system that quantifies careful driving scores. As a negative example: harsh braking and even typical driving behaviors were shown to cause phantom traffic jams in various studies performed by universities and automakers, among others. On an incident level, these types of positive or negative actions (and associated responsibility) may be recorded and validated by peer connected vehicles 102 through blockchain to be quantified and included in the traffic congestion externality calculation.

Referring more specifically to the process 500, at operation 502 the transportation mobility cloud 134 periodically receives vehicle speed, traffic density, and other information sent from the vehicles 102. For instance, the vehicles 102 connected to the transportation mobility cloud 134 send packets of data to the transportation mobility cloud 134 at a threshold frequency (e.g., every 30 seconds in one example). This data may include, as some non-limiting examples, vehicle speed, traffic density (e.g., according to camera sensor measurement via the imaging sensors 120 at the location of the vehicle 102), and/or average vehicle speed of vehicles 102 in lane(s) surrounding the vehicle 102.

At 504, the transportation mobility cloud 134 uses a traffic speed-density function to estimate the level of traffic. More specifically, to compliment or replace use of vehicle 102 speed and speed limit, the transportation mobility cloud 134 may utilize a traffic density and distance headway equation (1), where headway is defined as a distance between front bumpers of two consecutive vehicles 102 as follows:

$$k = 5280/\bar{d} \tag{1}$$

where:
k=traffic density; and
$\bar{d}$=average headway (in feet).

It should be noted the equation (1) is only an example formulation proposed by the Massachusetts Institute of Technology (MIT), and that other formulations of computing traffic speed-density (e.g., vehicles per lane mile) may be used. As another possibility, traffic density may be determined using deep learning from streaming video and/or other vehicle sensors (e.g., radar, sonar, LIDAR, etc.) to determine a real-time density and speed of surrounding traffic. For instance, a determination of traffic density may be performed according to a comparison of the speed of a vehicle driving using adaptive cruise control as compared to the speed limit. As another possibility, a determination of traffic density may be performed by receiving dashcam video of vehicles in front of the vehicle 102 in combination with deep learning processing of Radar, Sonar, and/or Lidar data.

A vehicle 102 equipped with adaptive cruise control allows for a target vehicle speed to be set, and reduces or increases that speed based on the distance of vehicles in front. Based on the difference between adaptive cruise control speed, actual speed, and status (e.g., increasing speed, decreasing speed), headway ($\bar{d}$) can be estimated at a single point in traffic and thus density of traffic at that point by solving for k.

At operation 506, the transportation mobility cloud 134 calculates a proportion (P) of vehicles 102 on the road segment that are sending data to the transportation mobility cloud 134. For instance, the transportation mobility cloud 134 may further identify a corresponding point on a speed-flow diagram, and may also obtain the speed limit for the road (e.g., from map data of road speeds) to aid in forming the result. The transportation mobility cloud 134 may utilize the result of the traffic density result of the speed-density equation and the vehicle speed to compute the proportion (P).

At operation 508, the transportation mobility cloud 134 determines whether the proportion (P) exceeds a predefined threshold value. In an example, the threshold P may be set to a value where there are a sufficient proportion of vehicles 102 on the road segment to provide for reliable information. If P exceeds the threshold, control passes to operation 510. Otherwise, control passes to operation 512.

At 510, the transportation mobility cloud 134 calculates details regarding the costs of vehicles 102 traversing the road segment. In an example, the transportation mobility cloud 134 may calculate precise information on the level of traffic congestion (e.g., where traffic currently is on the speed-density diagram), and thus can give an estimate of the marginal cost of a given additional vehicle 102 traversing the road segment. In another example, the transportation mobility cloud 134 may calculate a mix of vehicles 102 on the road segment, and thus can predict a fuel economy/emissions impact of the traffic.

To aid in the calculation, in some examples on-vehicle imaging sensors 120 from transportation mobility cloud 134 connected vehicles 102 may attempt to classify the surrounding vehicles 102 by make, model, model year, or fuel type (e.g., by machine identification of captured images of a hybrid logo, diamond CNG badge, electric fuel outlet, etc.) After operation 510, the process 500 ends.

At 512, the transportation mobility cloud 134 uses the speed-density value estimate to calculate a social cost including a marginal time cost to other vehicles 102 on the road. In an example, the transportation mobility cloud 134 may estimate an increase in emissions due to a lower average speed based on average fuel economy of vehicles 102 in the region using a stock turnover and emissions model. Some example models may include the California EMFAC/VISION 2.1 model, the US EPA MOVES model, etc. Over time for a given road segment, the average may be improved by using historical transportation mobility cloud 134 data. Additionally, if at least some days P exceeds the threshold, then an earlier precise computed value may be used to improve later estimated values for that road segment.

Figure 6:
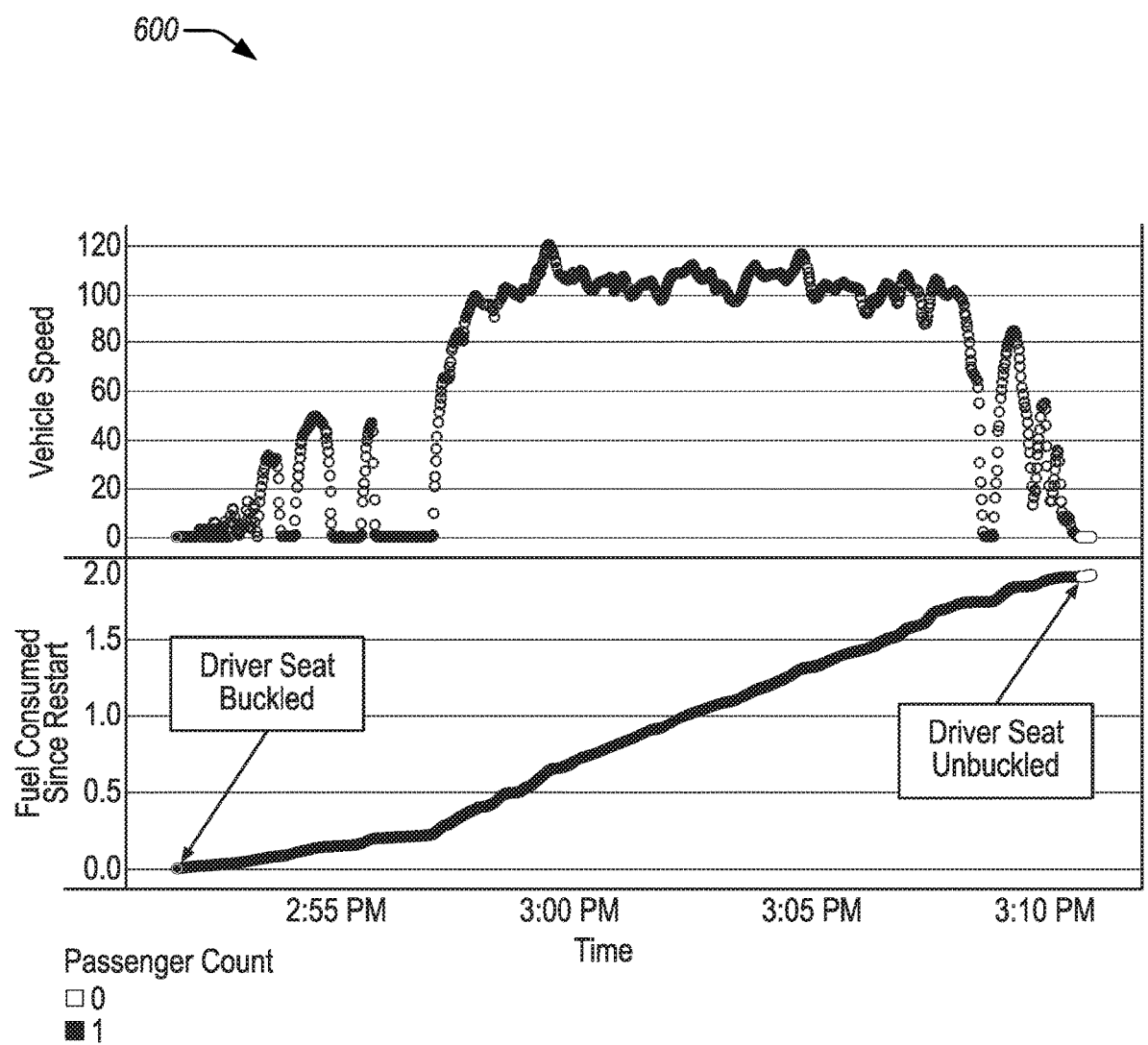
FIG. 6 illustrates an example graph of a single-occupant vehicle trip with passenger count determined by seat belt status.

FIG. 6 illustrates an example graph 600 of a single-occupant vehicle (SOV) trip with passenger count determined by seat belt status. When performing a trip calculation for a SOV trip, the calculation is straightforward—emissions responsibility associated with the trip fall entirely on the sole occupant. Computationally, trips where multiple people share the same trip (e.g., a family of four making a trip to the grocery store in their private vehicle) would follow the same logic, except in this case, each passenger's CO2 responsibility is divided by the total vehicle occupancy count.

Figure 7:
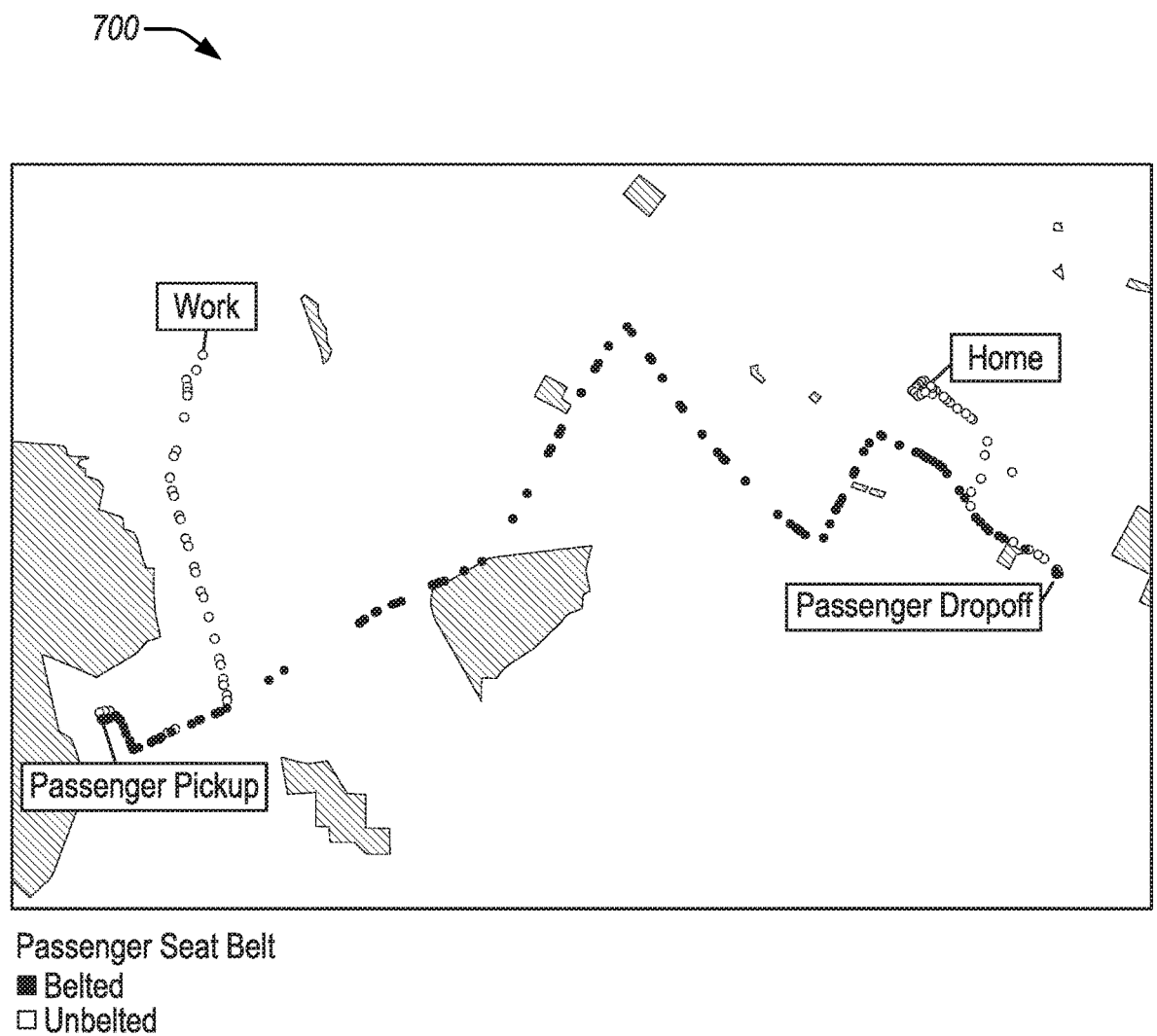
FIG. 7 illustrates an example map of a carpool with passenger count determined by seat belt status.

FIG. 7 illustrates an example map 700 illustrating a carpool with passenger count determined by seat belt status. In the example, the vehicle 102 is an electric vehicle with zero tailpipe emissions; however, WTT emissions responsibility from electricity consumption may be assigned to the vehicle occupants.

For carpool trips, emissions responsibility may be assigned by total energy consumption during the time each occupant is in the vehicle 102, divided by the average number of occupants over that time. Although this approach results in a higher energy consumption penalty for the driver, relative to making that trip with no other occupants, the driver will have a lower emissions profile. Furthermore, this may be deemed to be a fair allocation given the driver has more flexibility throughout the day of having his or her vehicle 102 available.

Additional details may be considered for fixed-route and dynamic public transit modes, microtransit shuttles, and rideshare situations. From a near-term marginal cost perspective, a decision to take any fixed-route service results in nearly zero additional emissions. Stepping onto a public transit bus, for example, may increase emissions to the extent of a small amount of added weight; however, this bus would drive the same route regardless of any given day's ridership.

This emissions calculation framework takes the long-term macro-perspective in terms of examining emissions responsibility, meaning that an emissions accounting is done based on actual ridership in order to encourage (on a system level) service optimization. For example, if a certain area is poorly-served by a large public transit bus, perhaps dynamic microtransit may be the ideal solution.

In any shared mode designed for revenue service, (in a non-autonomous vehicle 102) the driver is not counted for the purpose of emissions responsibility. An application with an emissions calculation may, accordingly, be configured to acknowledge cases where a private vehicle 102 owner (or taxi owner) is not making personal trips.

Figure 8:
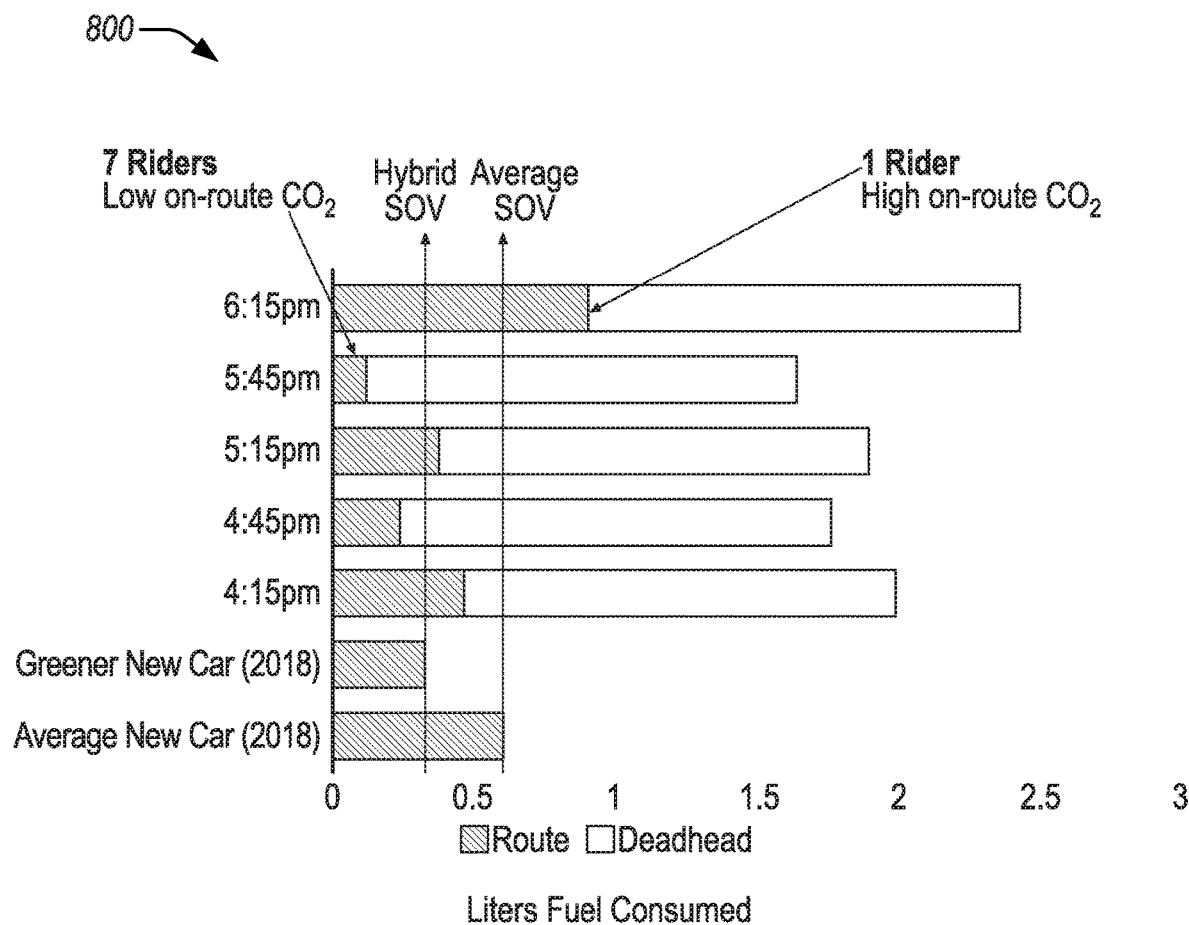
FIG. 8 illustrates an example of revenue trip and deadhead emissions for a microtransit route.

FIG. 8 illustrates an example 800 of revenue trip and deadhead emissions for a microtransit route. As shown, the route uses an early routing approach which may be used to include high deadhead travel to reach the route start and end, as well as deadhead trips from the destination to the trip start.

Emissions assignment may include revenue trip emissions as well as deadhead trip emissions. The revenue trip emissions relate to the segment of the trip when the rider boarded until the rider disembarked, where total energy consumption is divided by the average occupancy rate during this segment. For deadhead emissions, e.g., travel between the fleet depot to the route and any trips from the end of the route back to the start if the service line only goes in one direction, the emissions are divided by a total number of passengers during this service period (e.g., morning trips for a van sharing service).

Regarding goods delivery, goods delivery may also be included in this framework. Emissions from packages can be assessed in the same way as for passengers using a shared mode, with the exception that weight and dimensions must be included because package attributes may differ significantly. Delivery of a one-pound electronics item in a small box, for example, takes up much less space and adds less weight to the vehicle's load than delivery of a mattress, other factors held constant.

The described systems for computing emissions and allocating emissions to individuals and goods may be used to perform automatic transportation mobility cloud 134 fleet data reporting to satisfy regulatory requirements.

To address regulations such as the zero-emission requirement in California for an increasing share of transportation mobility cloud 134 trips or the requirement in London for zero-emission inner-city driving, this calculation framework can easily add on a rolling tracker of zero-emission vehicle and passenger miles traveled (PMT), as well as (spatially) the location of these zero-emission miles compared with locations where an internal combustion engine was engaged.

Figure 9:
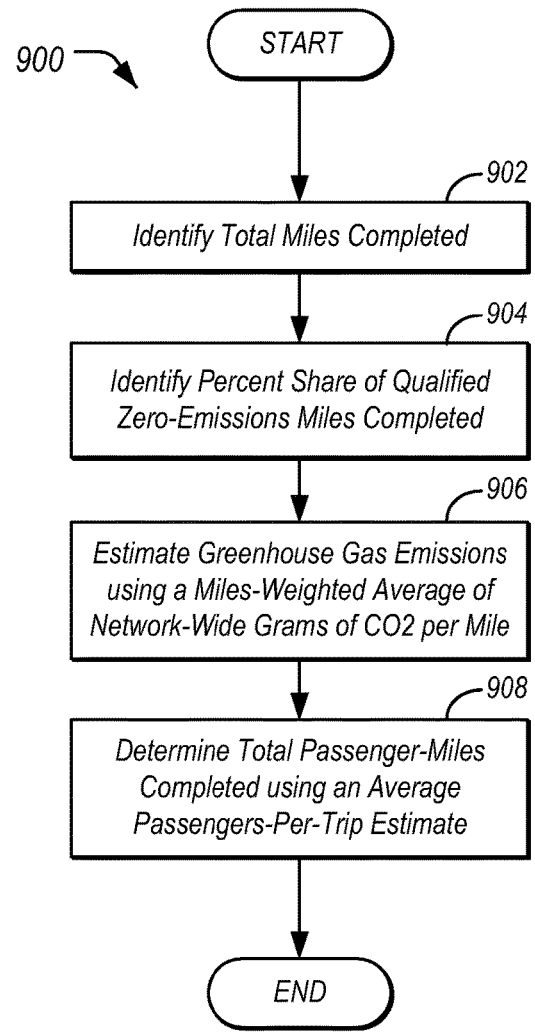
FIG. 9 illustrates an example process for computing information to address emissions regulations.

FIG. 9 illustrates an example process 900 for computing information to address emissions regulations. In an example, the process 900 may be performed by the transportation mobility cloud 134 utilizing the data and methods discussed herein.

At operation 902, the transportation mobility cloud 134 identifies the total miles completed by drivers. In an example, the transportation mobility cloud 134 may determine this count as a sum of the revenue distance traveled. As one possibility, this may be computed using total miles traveled excluding deadhead distance.

At operation 904, the transportation mobility cloud 134 determines a percent share of miles completed by qualified zero-emissions transportation. This may include, for example, miles completed by a vehicle 102, by walking, by biking, by other modes of active transportation, and/or by use of zero-emissions vehicles 102. The transportation mobility cloud 134 framework may handle this computation using the following example operations. The transportation mobility cloud 134 may identify the share of vehicle 102 miles traveled that qualify as zero-emission, e.g., plug-in hybrid distance driven on the battery charge deplete mode, relative to total distance driven by the fleet. An example is shown in equation (2) as follows:

$$ZEV\ Share = \frac{\Sigma\ VMT\ \text{Driven by } PHEV \text{ and}\ BEV \text{ on } EV \text{ Charge Deplete Mode}}{\Sigma\ \text{Fleet } VMT} \quad (2)$$

Additionally, transportation mobility cloud 134 framework may add in other qualifying distance traveled, including transferring from vehicle to bikeshare or walking for the final step of the trip, which will be easy to know, since multi-modal journeys are tracked. An example is shown in equation (3), as follows:

$$ZEV\ Share = \frac{\Sigma\ VMT\ \text{Driven by } PHEV \text{ and}\ BEV \text{ on } EV \text{ Charge Deplete Mode} + \Sigma\ \text{Cycling, Walking, etc.}}{\Sigma\ \text{Fleet } VMT} \quad (3)$$

At operation 906, the transportation mobility cloud 134 estimates greenhouse gas emissions using a miles-weighted average of network-wide grams of CO2 per mile. In an example, the transportation mobility cloud 134 may utilize the maintained data to sum the greenhouse gas emissions from fleet operations, categorized by metric (e.g., tailpipe, well-to-tank, externality), and provide an average. If a regulation does not require a specific component tracked by the transportation mobility cloud 134, then the transportation mobility cloud 134 may exclude those emissions from the data set. Accordingly, this precise value may be useful in encouraging low-carbon fuel use, for example, if carbon reduction is of value, biofuels and renewable fuels use in non-electric vehicles 102 may make sense to utilize. For instance, a diesel engine equipped vehicle 102 may be refueled with B20 biodiesel or a renewable diesel blend as opposed to a fossil fuel source to reduce WTT emissions resulting from use of the vehicle 102.

At operation 908, the transportation mobility cloud 134 determines total passenger-miles completed using an average passengers-per-trip estimate. As the transportation mobility cloud 134 tracks passenger journeys using the user data 146, this data may be computed as well. Moreover, by exceeding what regulators request in terms of accuracy and information, an operator of the transportation mobility cloud 134 may encourage adoption of the transportation mobility cloud 134 platform. After operation 908, the process 900 ends.

Moreover, the transportation mobility cloud 134 may also be utilized to provide fleet vehicle actionable recommendations. As vehicle data 144 is collected for analyzing fuel consumption, the transportation mobility cloud 134 may also build a vehicle profile and recommend to individual private vehicle owners, fleets, and smart mobility fleets cost-optimal and sustainable options for future replacement vehicles 102.

For example, a fleet manager may choose a gasoline-hybrid autonomous rideshare vehicle 102 due to concerns surrounding battery range; however, at least for one particular vehicle's maximum daily driving, accounting for drive cycle changes in altitude or use of heating or air conditioning, the battery range of a new electric autonomous vehicle 102 would be more than sufficient. Furthermore, if the fleet requires additional zero-emissions miles driven to meet state regulations—in this event, identifying a viable candidate clean vehicle 102 replacement option would contribute toward avoiding a penalty.

Recommendations may come on the well-to-tank (WTT) side as well. Continuing with the earlier example of demonstrating an emissions benefit to a transit agency of switching from fossil-sourced CNG to renewable CNG. The same applies to other fuels, for example fossil diesel to renewable diesel, or the standard electricity grid mix to using solar based on fleet electricity costs and cost-effectiveness of mitigating the peak electricity demand level.

The transportation mobility cloud 134 may also create an ex-ante passenger emissions estimate. The estimate shown and assigned to a customer for any given travel mode(s) may be generated based on forecasts rather than actual results, while the aforementioned calculation framework to be distributed to government and enterprise clients, regulators, and potentially institutions of higher education (e.g. institutes of transportation studies) may be accomplished in real-time, with backend results available ex-post.

With regard to computation of a final value to display to an end customer (e.g., via the emissions tracking application 150), the transportation mobility cloud 134 may perform an estimation according to transportation mode. An unbiased approach using average historical data (within a relevant timeframe, giving higher weight to more recent data or seasonal trends) from the ex-post calculation framework may be used to estimate per-passenger emissions. As shown in equation (4), an example estimation may assume CO2 includes tailpipe, well-to-tank, and externality components:

$$CO2\left(\frac{g}{PMT}\right) = \frac{\text{Vehicle CO2}\left(\frac{g}{mi}\right)}{\text{Average Occupancy}} \quad (4)$$

There are important issues with such a method in the context of encouraging consumer behavior that minimizes emissions. While providing fixed-route bus service in a given area may be associated with some typical occupancy rate and fuel consumption value, for example, the marginal consumer decision to use the service has nearly zero emissions, because unlike the choice of taking a private car, the bus would still run its route.

An example commute may have two options available to a user. A first option may be for the user to drive a personally-owned electric car. This mode has zero tailpipe emissions, potentially well-to-tank emissions from generating electricity, and during a commute hour, an externality imposed by adding one more car to worsening traffic congestion, which increases overall emissions.

A second alternate option may be for the user to take a fixed-route ride-share a to public train to a public transit bus. Suppose the fixed-route ride-share van has an average of three passengers and operates on gasoline, the train has high ridership and operates on diesel, and the public bus has an average of four passengers and operates on diesel. From a per-passenger CO2 perspective, this commute route may have higher actual CO2 from the ex-post calculation framework, because three passengers for the fixed-route van and four for the diesel bus segment are much higher than the WTT emissions from an electric car, and the fixed-route van and public bus both have to make deadhead trips to provide service.

From the ex-post framework, the first option may be displayed to the consumer (e.g., via the emissions tracking application 150) as having lower CO2 emissions; however, on a macro level, this decision is sub-optimal. The marginal consumer choosing the second option actually has nearly zero emissions (aside from some added weight to the vehicles' load) because the shuttle, train, and public bus are fixed routes. A consumer-facing result encouraging the second option may increase occupancy rates, and the ex-post calculation would inform the operators of the fixed-route van and the public bus service of the occupancy rate and fuel consumption, such that decisions could be made to bring the ex-ante consumer-displayed value and the ex-post value closer in alignment.

Involving fixed-route microtransit and public transit, as previously noted, factors such as deadhead CO2, occupancy rate, and CO2 of a particular bus for a given route should not be a part of the CO2 estimate presented to the consumer. As shown in equation (5), the following calculation may take a fleet average of ex-post values achieved with modifications in boldface as compared to equation (4):

$$CO2\left(\frac{g}{PMT}\right) = \frac{\text{Fleet Average Vehicle CO2}\left(\frac{g}{mi}\right) - \textbf{Deadhead CO2}}{\textbf{Integer Fleet Average Bus Seating Capacity}} \quad (5)$$

With respect to dynamic shared mobility services, as these are truly "shared" services and by definition (here) exclude hailed-type rideshare trips (e.g., Uber XL trips), there is potential to achieve an emissions benefit over driving.

Concerning use of a private vehicle 102, the transportation mobility cloud 134 may calculate an estimate of what the ex-post value will be. The value may be updated based on an average of the culmination of emissions from similar trips, assuming a Gaussian distribution with extreme outliers removed. "Similar trips" means trips with similar expected profiles, including origin and destination, time of day, and ambient air temperature (which would predict HVAC usage). Outliers may include, for example, a trip that begins as a typical commute but ends up having a long one-time deviation (e.g., returning home halfway through to pick up a forgotten item), for example. Note that factors such as energy consumption from a remote engine start or wasted energy searching for parking are automatically included in this calculation.

Regarding use of rideshare vehicles 102 with a single-occupant vehicle trip (e.g., hailed ride shares), the same computation approach as for a private vehicle 102 may be performed, except with the addition of deadhead emissions, per the deadhead formula for rideshare vehicles 102 noted in equation (5).

As for accuracy improvements over time, the user-side calculation displayed can learn from the ex-post computation of historical trip data. In other words, over many similar commute trips for each individual with a particular driving style and demand on accessory loads, we may be able to improve the estimate over time rather than offering a static value.

For a financial reward process, reducing emissions and traffic congestion have clear monetary impacts. For example, transportation demand management (TDM) solutions may be substantially cheaper than building a new multi-level parking garage, traffic congestion imposes economic harms well-documented in literature, and air pollution has clear health and consequently economic impacts.

Potential funding sources for rewards may be varied. Private companies such as vehicle 102 manufacturers, fleet operator, or suppliers participating in the transportation mobility cloud 134, are not in the business of bridging the gap between negative externalities of society's commuting habits and the social optimum. The transportation mobility cloud 134, however, serves as a platform with which industry can support the goals and policy requirements from governments and employers. Furthermore, governments and employers already spend substantial amounts of money on TDM programs, including providing subsidized or free public transit passes, subsidized carpool programs, and guaranteed ride home programs, as well as infrastructure for constituent and employee motor vehicle 102 use.

Thus, an example funding source for a rewards program may include TDM programs managed by local government, regional government, and employers. Another example may be contributions from local businesses that may benefit from consumers changing their habits, e.g., businesses either already nearby (or considering a location near) transit stops. These contributions could take the form of "you earned one free drink," for example. A further-reaching strategy could include using the transportation mobility cloud 134 to track vehicle-miles traveled for a road tax in lieu of gas tax. This possibility could set aside some portion of funding for encouraging sustainable mode choices.

In general, computing systems and/or devices, such as the vehicle 102 controllers, mobile device 126, and transportation mobility cloud 134, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the vehicle 102 controllers, mobile device 126, and transportation mobility cloud 134, generally include computer-executable instructions that may be executable by one or more processors of the computing devices. Computer-executable instructions, such as those of the emissions monitoring portal 148 and emissions tracking application 150, may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed by the vehicle 102 controllers, mobile device 126, and transportation mobility cloud 134 may be such computer program products (e.g., the emissions monitoring portal 148, the emissions tracking application 150, the data provider application 152, etc.). In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transportation mobility system comprising:
   a data storage configured to maintain
   vehicle data indicating fuel consumption, count of passengers for vehicles of a transportation system, and emissions profile information received by vehicles receiving fuel from refueling infrastructure, and user data describing movements of the passengers within the transportation system; and an emissions monitoring portal, programmed to
compute well-to-tank emissions for vehicles of a fleet accounting for emissions associated with production of the fuel, and provide, for the vehicles of a fleet, estimates of pollutant emissions for the fleet including the well-to-tank emissions and a percent share of miles completed by zero-emissions transportation for the fleet.

2. The system of claim 1, wherein the pollutant includes one or more greenhouse gases or criteria air pollutants.

3. The system of claim 1, wherein the emissions monitoring portal is further programmed to compute the zero-emissions transportation miles according to a transportation distance covered by an active mode, use of zero-emissions vehicles, or plug-in hybrid distance driven in a battery charge deplete mode.

4. The system of claim 3, wherein the active mode includes walking or biking.

5. The system of claim 1, wherein the emissions monitoring portal is further programmed to sum the pollutant emissions from fleet operations, categorized by one or more of tailpipe emissions, well-to-tank emissions, or externality to other travelers.

6. The system of claim 1, wherein the vehicle data further includes aggregated fuel consumption information for tank-to-wheels emissions computed by the vehicle according to vehicle emissions measurements.

7. The system of claim 1, wherein the vehicle data indicates passenger count according to one or more of: a check-in system tied to a radio frequency identifier (RFID) badge or user smart device, facial or other occupant recognition software, and/or seat belt status for each seat of the vehicle.

8. The system of claim 1, wherein the user data includes location and speed data captured by sensors of mobile devices of the passengers and is received by the data storage from the mobile devices.

9. The system of claim 8, wherein the user data indicates a user is within a vehicle responsive to location and speed information for the mobile device of the user matching location and speed information received from sensors of the vehicle.

10. A transportation mobility system, comprising:
a data storage configured to maintain vehicle data indicating fuel consumption and count of passengers for vehicles of a transportation system, and user data describing movements of the passengers within the transportation system; and an emissions monitoring portal, programmed to
estimate a level of traffic congestion for a road segment traversed by one of the vehicles, calculate a proportion of vehicles on the road segment from which vehicle data is being periodically received to the data storage, if the proportion exceeds a predefined threshold value, calculate a marginal cost of an additional vehicle traversing the road segment according to the level of traffic congestion, otherwise, estimate a social cost for vehicle traversal of the road segment based on average fuel economy of vehicles along the road segment, and provide, for the vehicles of a fleet, estimates of pollutant emissions for the fleet according to the estimates and calculations.

11. The system of claim 10, wherein the emissions monitoring portal is further programmed to estimate the level of traffic congestion by using one or more of a traffic speed-density function, image recognition from captured by the vehicle, data from radar, sonar, and/or LIDAR sensors, or data for real-time density and speed of traffic surrounding the vehicle.

12. A method for estimation of emissions resulting from use of vehicles comprising:
receiving, from vehicles of a transportation system, vehicle data indicating fuel consumption and count of passengers for the vehicles;

receiving, from mobile devices of passengers, user data describing movements of the passengers within the transportation system;

allocating revenue emissions of the vehicles to the passengers according to the fuel consumption divided by the count of passengers when the passenger was a rider, and allocate deadhead emissions to the passengers divided by a total number of passengers during a vehicle service period; and one or more of:
including, in the allocating of emissions, well-to-tank emissions for the vehicles accounting for emissions associated with production of the fuel and tank-to-wheels emissions computed by the vehicle according the vehicle emissions measurements, or receiving emissions profile information from the vehicles for computation of well-to-tank emissions, the emissions profile information being one or more of captured from refueling infrastructure providing fuel to the vehicles or estimated according to local utility information specifying an efficiency of local energy generation.

13. The method of claim 12, further comprising assigning zero emissions cost to transportation distance covered by walking, biking, use of zero-emissions vehicles, or plug-in hybrid distance driven in a battery charge deplete mode.

14. A method for estimation of emissions resulting from use of vehicles comprising:
receiving, from vehicles of a transportation system, vehicle data indicating fuel consumption and count of passengers for the vehicles;

receiving, from mobile devices of passengers, user data describing movements of the passengers within the transportation system;

allocating revenue emissions of the vehicles to the passengers according to the fuel consumption divided by the count of passengers when the passenger was a rider, and allocate deadhead emissions to the passengers divided by a total number of passengers during a vehicle service period; and providing an incentive to a passenger to choose a transportation route having lower emissions.

15. The method of claim 12, further comprising identifying when the passenger was a rider of a vehicle according to location and speed information received from a mobile device of the passenger matching location and speed information received from sensors of the vehicle.

16. A non-transitory computer-readable medium comprising instructions that, when executed by one or more hardware processors of a transportation mobility cloud, cause the transportation mobility cloud to:

maintain, in a data storage,
  vehicle data indicating fuel consumption, count of passengers for vehicles of a transportation system, and emissions profile information received by vehicles receiving fuel from refueling infrastructure, and
  user data describing movements of the passengers within the transportation system;
compute well-to-tank emissions for vehicles of a fleet accounting for emissions associated with production of the fuel;
sum greenhouse gas and criteria pollutant emissions from fleet operations, categorized by one or more of tailpipe emissions, well-to-tank emissions, or externality to other travelers, according to the received vehicle data; and
provide, via an emissions monitoring portal, estimates of the greenhouse gas and criteria pollutant emissions for the vehicles of a fleet and a percent share of miles completed by zero-emissions transportation for the fleet.

17. The medium of claim 16, wherein the vehicle data further includes
aggregated fuel consumption information for tank-to-wheels emissions computed by the vehicle according to vehicle emissions measurements and/or emissions by fuel type.

18. The medium of claim 17, wherein the vehicle data further includes information indicative of ambient humidity.

19. The medium of claim 16, wherein the user data indicates a passenger is within a vehicle responsive to location and speed information for a mobile device of the passenger matching location and speed information received from sensors of the vehicle.

20. A non-transitory computer-readable medium comprising instructions that, when executed by one or more hardware processors of a transportation mobility cloud, cause the transportation mobility could to:
maintain, in a data storage, vehicle data indicating fuel consumption and count of passengers for vehicles of a transportation system, and user data describing movements of the passengers within the transportation system;
utilize a traffic speed-density function to estimate a level of traffic congestion for a road segment traversed by one of the vehicles;
calculate a proportion of vehicles on the road segment from which vehicle data is being periodically received to the data storage;
if the proportion exceeds a predefined threshold value, calculate a marginal cost of an additional vehicle traversing the road segment according to the level of traffic congestion;
otherwise, estimate a social cost for vehicle traversal of the road segment based on average fuel economy of vehicles along the road segment; and
provide, for the vehicles of a fleet, estimates of pollutant emissions for the fleet according to the estimates and calculations.

21. A non-transitory computer-readable medium comprising instructions that, when executed by one or more hardware processors of a transportation mobility cloud, cause the transportation mobility cloud to:
maintain, in a data storage, vehicle data indicating fuel consumption and count of passengers for vehicles of a transportation system, and user data describing movements of the passengers within the transportation system, wherein the data storage includes a blockchain distributed ledger configured to maintain fuel supply chain information on well-to-tank emissions associated with fuel production and distribution;
sum greenhouse gas and criteria pollutant emissions from fleet operations, categorized by one or more of tailpipe emissions, well-to-tank emissions, or externality to other travelers, according to the received vehicle data; and
provide, via an emissions monitoring portal, estimates of the greenhouse gas and criteria pollutant emissions for vehicles of a fleet and a percent share of miles completed by zero-emissions transportation for the fleet.

* * * * *